(12) United States Patent
Ganesan

(10) Patent No.: US 8,887,248 B2
(45) Date of Patent: *Nov. 11, 2014

(54) JUBISM: JUDGEMENT BASED INFORMATION SHARING WITH MONITORING

(71) Applicant: Ravi Ganesan, West Palm Beach, FL (US)

(72) Inventor: Ravi Ganesan, West Palm Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/282,924

(22) Filed: May 20, 2014

(65) Prior Publication Data

US 2014/0259122 A1 Sep. 11, 2014

Related U.S. Application Data

(63) Continuation of application No. 13/470,141, filed on May 11, 2012, now Pat. No. 8,832,801.

(60) Provisional application No. 61/507,218, filed on Jul. 13, 2011, provisional application No. 61/485,512, filed on May 12, 2011.

(51) Int. Cl.
H04L 29/06 (2006.01)

(52) U.S. Cl.
CPC .................................. *H04L 63/08* (2013.01)
USPC ............................................................ 726/4

(58) Field of Classification Search
CPC .............................................. G06F 17/30165
USPC .................... 713/168; 726/4, 21, 28, 29, 31; 705/51–54; 709/217
See application file for complete search history.

(56) References Cited

U.S. PATENT DOCUMENTS

| | | | |
|---|---|---|---|
| 2009/0165101 A1 | 6/2009 | Peterka et al. | 726/6 |
| 2010/0192232 A1 | 7/2010 | Lee | 726/26 |
| 2010/0306548 A1 | 12/2010 | Kravitz | 713/182 |
| 2011/0067112 A1 | 3/2011 | Yoon et al. | 726/26 |
| 2011/0083197 A1 | 4/2011 | Claudatos et al. | 726/28 |
| 2012/0096560 A1 | 4/2012 | Selander et al. | 726/26 |
| 2013/0166904 A1 | 6/2013 | Amaya Calvo et al. | 713/151 |
| 2014/0032423 A1* | 1/2014 | Hopwood et al. | 705/306 |

OTHER PUBLICATIONS

Grzonkowski et al., "A DRM Solution based on Social networks and enabling the idea of Fair Use", May 2007, pp. 1-11, "web.mit.edu/comm-forum/mit5/papers/s_grzonkowski_DRM.pdf".

(Continued)

*Primary Examiner* — Hadi Armouche
*Assistant Examiner* — Hee Song

(57) ABSTRACT

A new system for information sharing is described which uses human judgement to accelerate the flow of information, while simultaneously applying brakes to restrict the velocity. This combination results in a system where information is shared judiciously while minimizing the likelihood of information leakage or information overload. A built in monitor allows for the detection over time of sharing characteristics. Information in this system is stored on a server, however, is optionally encrypted in a fashion that makes it impossible for the server to actually see the information. Further innovations are also described including the ability to overlay incentive mechanisms to facilitate appropriate information sharing, and the notion of introducing automated bots into the system to augment human filter based information sharing.

14 Claims, 2 Drawing Sheets

THE JUBISM SYSTEM (SCHEMATIC BLOCK DIAGRAM OF FIGURE 1)

(56) References Cited

OTHER PUBLICATIONS

Xiong et al., "Towards end-to-end secure content storage and delivery with public cloud", pp. 257-266, CODASPY'12 Proceedings of the second ACM Conference on Data and Application Security and Privacy, 2012.

Shehab et al., "ROAuth: recommendation based open authorization", SOUPS '11 Proceedings of the Seventh Symposium on Usable Privacy and Security, pp. 1-12, 2011.

* cited by examiner

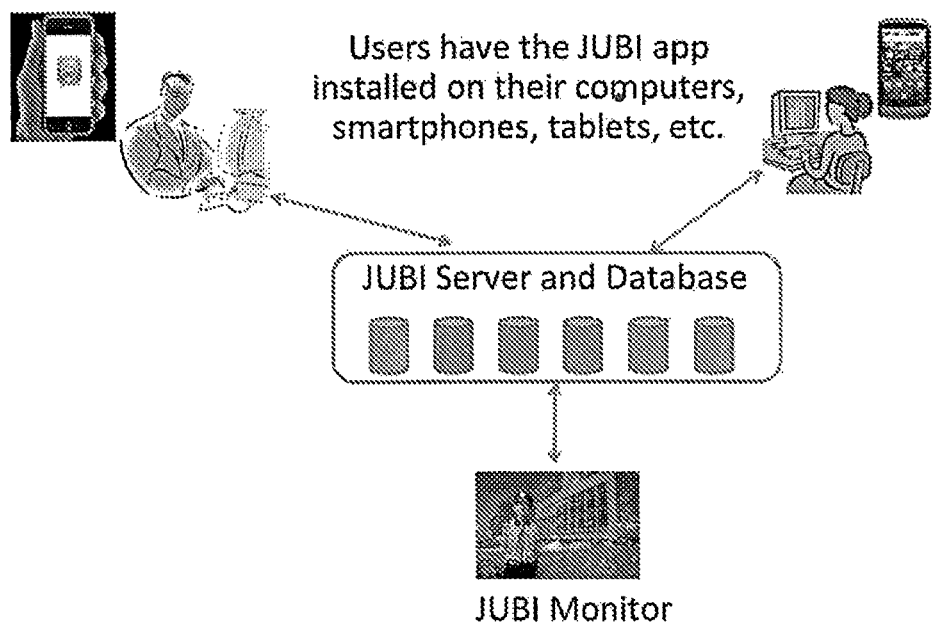
FIGURE 1: THE JUBISM SYSTEM

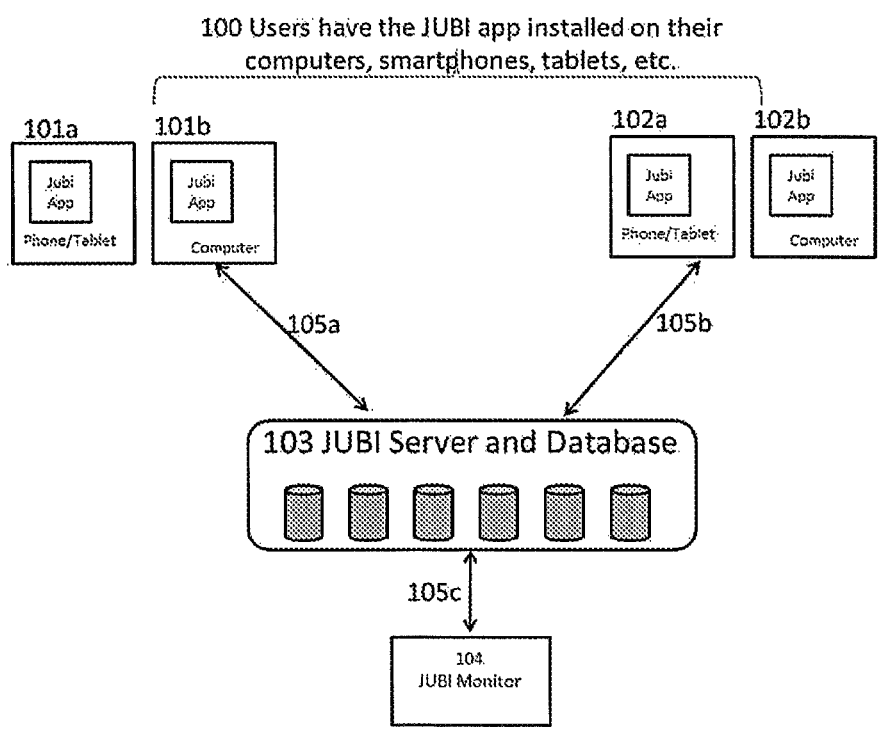
FIGURE 2: THE JUBISM SYSTEM (SCHEMATIC BLOCK DIAGRAM OF FIGURE 1)

JUBISM: JUDGEMENT BASED INFORMATION SHARING WITH MONITORING

RELATED APPLICATIONS

This application claims priority based on Provisional U.S. Application Ser. No. 61/485,512, filed May 12, 2011, and entitled "JUBISM: Judgement Based Information Sharing with Monitoring", and on Provisional U.S. Application Ser. No. 61/507,218, filed Jul. 13, 2011, and entitled, "Enhanced JUBISM", the contents of which are incorporated herein in their entirety by reference.

TECHNICAL FIELD

This invention relates to secure information sharing. Specifically it relates to methods to allow for secure and efficient information sharing.

BACKGROUND OF THE INVENTION

Secure and efficient information sharing has been a long-standing problem in many contexts. Sharing "too freely" results in information leakage. Yet, not sharing enough results in a failure to 'connect the dots'. Even if information leakage is not the concern, overly free sharing of information results in information overload. Various solutions to these problems have been proposed, yet the problems persist. Before turning our attention to our new solution to this old problem, let us consider the two broad methods of information sharing currently prevalent.

In the first category are the "information push approaches. Email, instant messengering, voice mail, texting are examples of information push. Some of the key features are:
  TELLING (Alice feels Bob needs to know)
  ASKING (Alice can query Bob or a group)
  Expectation (justified or not) of PRIVACY
  Loss of CONTROL of information spread
  Not well suited for SEARCHING and FINDING
  No LENDING (limited duration sharing)
  REVOCATION (UNsharing) is usually hard to enforce
  MONITORING is possible, but not integral,
  In the second category are what we term the "publish and subscribe" model. Social networks, listservs, wikis, blogs, microblogs are example of this model. Some of the key features are:
  TELLING and ASKING happen; but without expectation that "correct" person will receive the th question or the answer
  SEARCHING and FINDING are fundamental
  Low expectation of PRIVACY
  Significant loss of CONTROL of information spread
  No LENDING (limited duration sharing)
  REVOCATION (UNsharing) is usually hard to enforce
  MONITORING is possible, but not integral
  Neither model has been successful in optimal information sharing. The end result is still either too little sharing and a resultant failure to connect the dots, or else too much sharing resulting in information leakage and information overload.
  Rely on human judgement on what to share with whom. Can be over-ridden by policies but is not driven by policies such as "all people at this level can see", or, "prove that there is a need to know".

OBJECTIVES OF THE INVENTION

It is an objective of the present invention to address these problems.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to the invention, a network server relies on human judgement and some number of other controls to control distribution of information stored on a network, such as the Internet. In an exemplary implementation, the server operates to control such distribution by receiving data units from contributing users in community of users via a network. Users in the user community may include human beings as well as intelligent systems, such as bots, having the logic to perform automated script fetches from information servers on the network.

Each received data unit is received from a single contributing user, which in theory could be entity having multiple individuals, and includes a copy protected information object that is encrypted with a cryptographic key K, which is preferably a symmetric crypto-key. Each cryptographic key K is also received from the applicable contributing user via a network, and is itself received already encrypted by the applicable user with another cryptographic key, e.g. an asymmetric crypto-key.

The received data units are stored in a database, each in association with an identifier of the contributing user and a sharing (S) limitation parameter restricting the amount of sharing, e.g. the number of hops, of the received data unit, a sharing time to live (STTL) limitation parameter setting a time period after which a sharing authorization expires, a loan time to live (LTTL) limitation parameter setting a time period after which a borrowing authorization expires, and a security clearance level (SCL) limitation parameter setting a minimum security clearance level for access. Each received encrypted cryptographic key K is transmitted to an escrow agent.

The server receives inquiries from inquiring users via the network. Each inquiry is directed by the applicable inquiring user to one or more users and requests information relevant to a respective particular subject. The server transmits the received inquiries as directed by the inquiring user via the network. The server receives responses, via the network, including contributing user authorizations of the inquiring users to share the stored data units, non-contributing user authorizations of the inquiring users to further share the stored data units, non-contributing user authorizations of the inquiring users to borrow the stored data units and recommendations to the inquiring users to direct their inquiries to recommended other users in the user community. The server also receives, via the network, revocations of previously received share authorizations, further share authorization, and borrow authorization.

Subsequent to receipt of the authorizations, the server receives request to access the stored data units from the inquiring users via the network, and allows or denies access to the stored data units in response to the received access requests, based on the received share authorizations, the received further share authorizations, the received borrow authorizations, the received revocations, the stored S limitation parameters, stored STTL limitation parameters, stored LTTL limitation parameters, and stored SCL limitation parameters. The server also transmits the received recommendations to the applicable inquiring users and the recommended other users. In this regard, the server may receive requests to form user groups including applicable inquiring users and recommended other users to whom recommendations have been transmitted and, if so, establishes user groups within the user community in accordance therewith.

The server also logs (i) the received share authorizations, (ii) the received further share authorizations, (iii) the received borrow authorizations, (iv) received recommendations, (v) received revocations, and (vi) the received access requests, with respect to each user. Based on the log, the server can generate a rating of each of the users in the user community in a range between promiscuous sharer and information hoarder and/or modify the stored S, the stored STTL, and/or the stored TLLT limitation parameter.

The server may also receive, from the inquiring users via the network, indications of how valuable the stored data units they have been authorized to share or borrow, and the recommendations they have received, were in addressing their inquiries. The server can rate the authorizing and recommending users based on the received value indications, for example using value amounts, such as dollar values.

As discussed above, beyond the human control, the server may operate to only enforce a limited number of controls in a given implementation. According, in another exemplary implementation, the network server operates to control distribution of information stored on a network by receiving data units, each including an information object, from a community of users via a network. As noted above, in some implementations users may be human being as well as intelligent systems having the logic to perform automated script fetches from information servers on the network, such as bots. The information objects are preferably copy protected and encrypted. The server stores the received data units in a database. Each data unit is stored in association with an identifier of the user in the user community from whom the applicable data unit was received and a sharing (S) limitation parameter. In this example, the stored data units include a first stored data unit received from a first user in the user community.

The server receives an inquiry, directed to the first user, requesting information relevant to a particular subject, from a second user in the community, via the network. The server transmits the received inquiry to the first user via the network. In response, the server receives, via the network, authorization of the first user to share the stored first data unit with the second user. Subsequently, the server receives a request to access the stored first data unit from the second user via the network and, based on the received first user share authorization, in response allows the second user to access the stored first data unit via the network.

The server also receives, via the network, authorization of the second user to share the stored first data unit with a third user in the community of users. Subsequently, the server receives a request to access the stored first data unit from the third user, via the network. However in response, access to the stored first data unit by the third user is denied based on the stored sharing limitation parameter associated with the first data unit.

If the applicable sharing limitation parameter allows multi-hop, e.g. two (2) hop, sharing, then the denial of access by the third user means that the server had received, prior to receipt of the second user authorization to share with the third user, another authorization of the second user via the network to share the stored first data unit with another, say a fourth, user in the user community. If, subsequent to receipt of the other second user share authorization, i.e. the share authorization for the fourth user, the server receives a request to access the stored first data unit from the fourth user via the network, based on the other second user share authorization and the stored sharing limitation parameter, in response access to the stored first data unit by the fourth user is allowed.

Although not mandatory, each of the received data units is preferably also stored in the database in association with a time to live (TTL) limitation parameter. If so, should the server receive, subsequent to receipt of the first user share authorization and to allowing the second user to access the stored first data unit, a further request to access the stored first data unit from the second user via the network, in response access to the stored first data unit by the second user may be denied based on the stored TTL limitation parameter.

Each of the received data units is preferably also stored in the database in association with a lend time to live (LTTL) limitation parameter. If so and the server receives, via the network, authorization of the second user to lend the stored first data unit to another user in the user community, and subsequently receives a request to access the stored first data unit from the other user via the network, the server will, in response, allow or deny access to the stored first data unit by this other user based on the second user lend authorization and the LTTL limitation parameter. If the server receives, subsequent to receipt of the second user lend authorization, another request to access the stored first data unit from the second user via the network and the loan period set by the LTTL limitation parameter has not expired, the requested access to the stored first data unit by the second user will be denied based on the second user lend authorization. That is, data units that are borrowed are no longer available to the lender until expiration of the LTTL period or revocation of the loan.

Accordingly to still other options the server may operate to also receive, from a user via the network in response to a transmitted inquiry, a recommendation to forward the inquiry to another user in the user community. In which case, the server will transmit the received recommendation to the inquiring user and the recommended user. If the server subsequently receives a request to from a user group including these users, it may also establish a user group within the user community with these users.

It is highly recommended that a user be able to revoke an authorization. Accordingly, beneficially the server is able to receive, from the first user via the network, revocation of the first user share authorization. If, subsequent to receipt of the first user share revocation, the server receives another request to access the first data unit, from the second user via the network, the server will, in response, deny the requested access to the first data unit by the second user, based on the received first user revocation.

The received first data unit may also be stored in the database in association with a required security clearance level (SCL) limitation parameter. If so, the server can determine a security clearance level of the second user, e.g. from previously store personal information for the second user, and compare the determined security clearance level to the associated required SCL clearance limitation parameter. The server then determines whether or not the second user has the required security clearance level based on the comparison. In such a case, allowing the second user to access the first data unit is based also on a determination that the second user meets the required security clearance level.

The server will also preferably operate so as to log authorizations to share stored data units with respect to each user. If so, the server may additionally rate each of the users in the user community in a range between promiscuous sharer and information hoarder and/or modify the stored sharing limitation parameter, based on the log.

As noted above, in this exemplary implementation it may be beneficial for the information objects in the stored first data unit to be encrypted with a cryptographic key. If so, the cryptographic key is generated and also encrypted by the first user. Additionally, the server will also preferably receive the encrypted cryptographic key encrypting the first data unit, and transmit the received encrypted cryptographic key to an escrow agent.

The server may also beneficially operate to receive from the second user via the network, an indication of how valuable the first data unit is in addressing the inquiry. If so, the server may determine a value amount, e.g. a dollar value amount, based on the received value indication, and assign the determined value amount to the first user.

It should also be understood that the method described above will typically be implemented by a server having one or more ports through which it communications via the network and a processor with the programmed logic, typically but not necessarily executable software, to perform as described above.

BRIEF DESCRIPTION OF DRAWINGS

FIG. 1 depicts a conceptual view of the JUBISM system.
FIG. 2 depicts the JUBISM system, as shown in FIG. 1, in a schematic block diagram.

PREFERRED EMBODIMENT(S) OF THE INVENTION

JUBISM is an innovative new model of information sharing which:
- Leaves it to individual human judgement to decide whom to share what information with.
- While simultaneously restricting the velocity of information travel by (i) restricting the distance a given piece of information can travel away from its author, (ii) making it difficult to copy information out of the system, (iii) providing mechanisms for "information lending", (iv) providing mechanisms for "revocation of sharing" and (v) allowing for monitoring of information flow.

Taken together, the JUBISM experience represents a new point in the classic information sharing trade-offs. We now turn to our preferred embodiment.

Framework

Users interact with the JUBISM system using their JUBI apps (100) on their computers (101*a*, 102*a*), tablets, smartphones (101*b*, 102*b*), etc. The JUBI apps in turn communicate with a JUBI Server (103) to provide information sharing, with the JUBI Monitor (104) providing the monitoring.

A given JUBISM community consists of users each of whom is connected to a subset of other users whom they know, or have been introduced to. In this respect, the way a JUBISM community forms and evolves closely resembles the way a social network develops. There will usually not be a centralized directory, nor the ability to communicate with users to whom one has not established a connection. Connections are established via an invitation mechanism.

The unit of information in a JUBISM system is the JUBIT which consists of an object of information and associated meta information which can optionally carry the name or description of the object and also carry other information. Users use their JUBIs (100) to create a JUBIT, for instance by typing a note, or importing a picture, using their JUBI. The creator of a JUBIT is referred to as the author (even if the object was imported from some external source). Once created the JUBIT is stored on the JUBISM Server (103) and is ready to be shared. A pointer to the JUBIT along with the meta information is stored on the JUBI app (100) itself. In general with the exception of short term caching, the JUBITs are themselves only stored server side. The JUBI itself provides no way for information to be exported. It is not anticipated that this will be enforced by rigorous copy protection or some form of mandatory access control, rather the accent here is on making it "difficult not impossible" to export information. JUBITs can be referenced within other JUBITs, but the information is not replicated.

A user's set of pointers and their links to other users is termed their "state". In general it is assumed that users log into the JUBI server (103) at periodic intervals using some form of authentication at which point their state is downloaded to their JUBI. This is analogous to how a messengering client gets configured. The look and feel of a JUBI can vary. In general it will contain the following elements:
- A list of all the other users the user is connected to, along with a way to manage this list, for instance by creating groups. A mechanism to send and accept invitations for new connections will also be present.
- A classic in-box is likely to be present comprising the JUBITs received, with an optional mechanism for classifying the JUBITs into some folder mechanism. It should be remembered that in general it is pointers to the JUBITs and the meta information being stored locally, not the JUBITs themselves. The JUBITs are cached locally only for viewing.
- The centerpiece of the JUBI is the information sharing system which we describe further.

Information Sharing in JUBISM

A user can use their JUBI to perform the following functions:
- ASK other user(s) to whom they are connected for a JUBIT (s) should they have one that is relevant. In general the query will be targeted only at users whom the user believes have relevant information or might know who has the information. The recipient of the query may or may not have a relevant JUBIT(s), may or may not know of others who have relevant JUBIT(s), may or may not in their judgement choose to share.
- SHARE a JUBIT with another user either of their own volition or in response to a ASK request. If the user is not the author of the JUBIT, they are only able to share it if the JUBIT "hop count" permits it. For instance, in a JUBISM system running at a hop count of two, a JUBIT can never travel more than two hops away from its author. As a consequence a user can only forward JUBITS received from an author, and not one received indirectly. While it is conceivable that the hop count is set at a JUBIT level by the author, in general we recommend a system wide hop count for an organization, and specifically recommend the effectiveness be evaluated at a hop count of two, which "feels right" for most environments.
- LEND a JUBIT. This action has all the properties of a SHARE action, except that the recipient's access to the JUBIT expires at a pre-defined time.
- RECOMMEND a source. A user who does not have requested information but knows of others who might have the information, recommends the source for the original ASK, with the messages going to both the requestor and the potential source. If those two are not already connected, it is up to them to decide whether to connect and then share the JUBIT. Optionally a transient connection for the transfer of the particular JUBIT(s) in question can be set up. Observe that a RECOMMEND need not be the result of an ASK. A user might of their own volition decide to RECOMMEND a connection; for instance when they receive a JUBIT that has reached its maximum hop count.

REVOKE a JUBIT that had previously been shared. The recipient loses subsequent access to the JUBIT. The REVOKE is automatically recursive and is propagated to all those who received the JUBIT. Observe that the recipient of a REVOKE does not have to take any action, the JUBIT will simply show as being revoked (note the meta information will still be available to the recipient; i.e. their JUBI will "remember" that it had the JUBIT at one point). Alternately a user can perform a system wide REVOKE which simply removes the JUBIT (though not the meta information) from the server itself.

The JUBISM Server (103)

The JUBISM server acts both as a switch between the JUBIs, as well as the data store. It passes messages back and forth between the JUBIs, caching messages as needed if a destination user is not available. It stores JUBITs and maintains a list of which users are allowed to access the JUBIT. This list changes as the JUBIT is SHARED, REVOKED, etc. Privileges to support the LEND construct are time sensitive. It uses some external authentication system or federation mechanism to authenticate users.

The JUBISM Monitor (104)

The JUBISM Server has the ability to continuously monitor the message flow in the system and can trace the path of a JUBIT. This can be used both for forensics as well as for analytics. For instance, users may be classified on a scale ranging from promiscuous sharers to information hoarders. As another example, an analysis of effectiveness may lead to adjustment of the hop count for a given organization. As described here, the JUBISM Monitor could simply be implemented as a part of the JUBISM Server. We choose to describe it as a separate entity as we will be using it as an escrow service once we overlay some optional privacy features on top of it.

Privacy in JUBISM

As described here, the JUBISM Server has access to all the JUBITs, and the privacy is enforced by access controls. If one desires privacy from the server itself, then the author can encrypt the JUBIT with a session key, and envelop the session key using standard cryptography such that only the recipient can retrieve the session key and decrypt the JUBIT. In this case the server continues to store the JUBIT, but it is opaque to it. (the meta information may also be encrypted if desired). For many target environments of interest it would be preferable to also escrow the session key with a trusted third party, perhaps co-resident with the JUBISM Monitor. In such an environment the JUBISM Monitor in effect acts like a 'user' who is connected to every user and is a silent recipient of every JUBIT shared. The JUBIs automatically perform enveloping if desired.

Extending JUBISM

JUBOTS

A fundamental premise of the system we just described is that it is based on human powered search. This is not a system for SEARCHing and FINDing information, rather the goal is to facilitate ASKing and TELLing. One can however easily envisage bots that scour other information sources and become "experts" in certain areas. Such bots might become special users in the JUBISM system, and we call them JUBOTS. In addition to SHARING information they have, one can conceive of intelligent JUBOTS that analyze the system and act purely as RECOMMENDers, recommending certain JUBITS be shared, or that certain users connect.

Connecting Separate JUBISM Systems

Our notion of JUBISM started with the notion of creating a flat system with users across multiple organizations united by a sense of community. For instance the US Intelligence Community comprises several agencies. While our preferred approach would be to connect them with one JUBISM system, an alternative is to create several separate JUBISM systems and allow for inter-connectivity, perhaps with special gateways. Such gateways could enforce rules about what information can be shared with which other JUBISM system. Such an approach may become necessary for sheer scalability, though the existence of social networks of immense scale argue otherwise.

Overlaying Policies on JUBISM

If information is currently shared using a classification and security clearance mechanism, then it is possible to modify the JUBISM system to ensure that the rules are followed. JUBITs will have to be categorized at the appropriate level, and the system will have to maintain the clearance level of the users, and then enforce the policies. Having such automatic over-rides certainly reduce some of the potential benefits of leveraging human judgement. However, a substantial portion of the benefits will still survive.

Commercial Applications for JUBISM

The concepts of JUBISM are clearly designed with information sharing for the Intelligence Community. However, it can also be used as a social network. Perhaps a social network for the small percentage of people who care about privacy. In such a social network one could have JUBOTs for music or video sharing services. Observe that one can sell music and allow it to be shared by LENDing. There could also be a JUBOT that shares promotional content from select sponsors based on user preferences leading to highly personalized advertising.

Adding Incentives to JUBISM

JUBISM was inspired by the context where information is not openly shared, even within a community or enterprise, and there arises a need to find new ways of searching for information. Information sharing within and between intelligence agencies of a national government is the classic motivating example. JUBISM achieves its purposes by simultaneously opening new pathways for information sharing based on human judgement, while simultaneously throttling the flow of information using a variety of techniques.

We observe that a very similar problem arises in a different context. Imagine a problem with the following three characteristics:

1. The solution cannot be (readily) assembled by a single individual from currently public information.
2. There exists a solution which would become readily apparent were the collective knowledge of a select group of individuals within a large community be assembled together. However, the particular combination of people, and the particular information each should contribute, is not knowable a priori.
3. Were all the individuals in the community who believe they have relevant information to make all the information they consider relevant available in a single database, then the amount of misleading or irrelevant information (noise), would far exceed the select information needed from the select group of individuals (signal). In other words the signal to noise ratio is too low to find the solution by regular information sharing.

In the original JUBISM context the need to "not share everything" arose from the risks of loss of privacy (e.g. national security concerns). In the reformulated problem, the need to "not share everything" arises from the poor signal to noise ratio problem identified in (3) above.

Further, sites such as Yahoo! Answers, ask.com and newer variants like quora.com or prizes.org are all variants on the bulletin board model, but in general are focused on problems where there is an individual who knows the answer. Our focus is not on such problems, rather it is on problems whose solutions can only be determined by putting together information from multiple sources.

To solve this broader class of problem, the core JUBISM model needs to be augmented with an incentive/disincentive structure with the resulting innovation more likely to yield satisfactory results.

We consider three of several incentive structures below:
1. When Alice receives a JUBIT from Bob, she is provided with a quick way to give him feedback on her perception of the value of the JUBIT (this perception may change later of course). For example she could quickly give it a "thumbs up", "thumbs down" or "neutral" rating. Bob can factor in her response for future JUBITs he might choose to send her. Note that the same mechanism can be used for introductions facilitated.
2. A more elaborate mechanism would provide incentives and disincentives. For instance, each act of sharing could "cost" the sender, and they may only "profit" if the receiver gives a "thumbs up" to the JUBIT. Further, there could be a situation where it "costs" the receiver to give a "thumbs up". [We can handle situations where Alice takes the information, secretly finds it useful, but then decides not to "pay for it" by (i) having rejected messages be instantly revoked, (ii) having a mechanism to share a teaser (perhaps only the meta information in a JUBIT), (iii) relying on policing my the JUBISM Monitor which could by analyzing behavior determine when this happens, (iv) by allowing Bob to challenge Alice once the solution is eventually found (the Monitor can tell if the solution could have been found without Bob's JUBIT. Other policing mechanisms could be in place.
3. The above incentives/disincentives can be further handled by introducing the notion of JUBI$s, a JUBISM specific currency, which tracks how much sharing can happen. Such a currency could be interchangeable (bought or sold) into real currency much like many other social gaming currencies.

Several variants of the above are possible, for instance one could value JUBITs authored by a user differently from those forwarded on, one can put a price on asking questions (in the above description we described the incentives/disincentives without specifying if the JUBIT from Bob to Alice was sent in response to a question or was unsolicited). Introductions that have value might result in higher pay-offs then those that do not.

The JUBI-GAME

A JUBISM system that is augmented with the above innovation is designed to be used to facilitate an entirely new way of information sharing. Yet, it can also be the basis for a social game. Let us start by examining a simple possibility:

A community of people who want to win prizes in the JUBI-GAME exists.

On a periodic basis a problem is posed which fits our criterion of the sort of problem that requires assembling specialized knowledge from a number of people in the community. This problem can be posed by members of the community, external individuals who want the problem solved or by the organizer of the game itself. Posting a problem could require payment of a certain amount of JUBI$s with a further payment if a solution is discovered.

Based on the description of the problem members of the community who feel they might be able to contribute enroll. Enrolling costs JUBI$s (earned from prior contests or bought by exchanging dollars).

A list of those enrolled and their areas of specialization (profile) is shared with all enrollees and the game begins. We resort to this mechanism as in a game situation it is unlikely users are part of a community with relationships though that could eventually develop.

[At this stage we could resort to the bulletin board solution of having all enrollees exchange thoughts and put a pricing mechanism to post, but we want something more subtle and sophisticated].

The community starts exchanging information. The economics of asking and telling and introducing will be structured to ensure that the most efficient contributor is rewarded the most.

When an individual declares a solution, it is (perhaps privately) examined by the entity proposing the problem and if it is acceptable, a "reward" is paid. The "reward" JUBI$s are shared based on how individuals contributed to the search. For instance, a person who made several key introductions and forwarded very appropriate JUBITs might well earn more than the person who declared the solution.

Several variants of just the above game, as well as several different JUBI-GAMEs itself suggest themselves once the above innovation is internalized.

Other Notes:

Any JUBIT sent from a user to another has a default Time To Live, and the user may be allowed option of setting this TTL between a range (e.g. 1 day to infinity). We observe that LENDing should not be confused with this concept. While Alice LENDING item to Bob also has concept of the JUBIT expiring once its LENDING period is over, LENDING has the other associated concept of Alice only being able to share the JUBIT with one other user at a time. It remains optional whether Alice herself has access to a JUBIT she has lent, whether she has multiple "licenses" to LEND, etc.

While the description of JUBISM and Enhanced JUBISM is described in terms of local "apps" in a "client server" model, it will be clear to a practitioner that the functionality can also be implemented in a typical browser web application model, with perhaps no or little state being saved locally.

Users may at times receive the identical JUBIT (even perhaps with the same meta information) from different sources. The identifier for a given JUBIT for purposes of actions such as revocation should therefore be a composite of the JUBIT identifier itself and the senders ID.

We further note that we are not necessarily requiring that the JUBISM system maintain user identities. The entire system may be built on "top of" or "integrated with" an existing system. For instance, JUBISM could be a Facebook or LinkedIn App. Or it could be integrated with an enterprise LDAP directory. This concept extends to other facets of the JUBISM system, for instance a user's "network" might be their existing social network One can conceive scenarios where the JUBITs themselves reside not in a JUBISM database, but in an existing data store.

The invention claimed is:

1. A system for controlling distribution of information stored on a network, comprising:
 a data store including a database; and
 a hardware processor configured to (1) receive data units, each including an information object, from a community of users via a network, (2) store in the database the received data units, with each data unit being stored in association with an identifier of the user in the user community from whom the applicable data unit was received and a sharing (S) limitation parameter, wherein the stored data units include a first stored data unit received from a first user in the user community, (3) receive an inquiry, directed to the first user, requesting information relevant to a particular subject, from a second user in the community via the network, (4) direct transmission of the received inquiry to the first user via the network, (5) receive, via the network in response to the transmitted inquiry, authorization of the first user to share the stored first data unit with the second user, (6) receive, subsequent to receipt of the first user share authorization, a request to access the stored first data unit from the second user via the network, (7) allow, based on the received first user share authorization and in response to the received access request, the second user to access the stored first data unit via the network, (8) receive, via the network, authorization of the second user to share the stored first data unit with a third user in the community of users, (9) receive, subsequent to receipt of the second user share authorization, a request to access the stored first data unit from the third user via the network, (10) deny, based on the stored S limitation parameter and in response to received third user access request, access to the stored first data unit by the third user, (11) receive, from the first user via the network, revocation of the first user share authorization, (12) receive, subsequent to receipt of the first user share revocation, another request to access the first data unit from the second user via the network, and (13) deny, based on the received first user revocation and in response to the received other access request, access to the first data unit by the second user.

2. The system of claim 1, wherein the processor is further configured to (1) receive, prior to receipt of the second user authorization to share with the third user, another authorization of the second user to share the stored first data unit with a fourth user in the user community via the network, (2) receive, subsequent to receipt of the other second user share authorization, a request to access the stored first data unit from the fourth user via the network, and (3) allow, based on the other second user share authorization and the stored sharing limitation parameter and in response to the received fourth user access request, access the stored first data unit by the fourth user.

3. The system of claim 1, wherein the processor is further configured to (1) also store each of the received data units in the database in association with a time to live (TTL) limitation parameter, and (2) allow the second user to access the stored first data unit via the network based also on the stored TTL limitation parameter.

4. The system of claim 1, wherein the processor is further configured to (1) receive, via the network, authorization of the second user to lend the stored first data unit to a fourth user in the user community, (2) receive, subsequent to receipt of the second user lend authorization, a request to access the stored first data unit from the fourth user via the network, (3) allow, based on the other second user lend authorization and in response to the received fourth user access request, access the stored first data unit by the fourth user, (4) receive, subsequent to receipt of the second user lend authorization, another request to access the stored first data unit from the second user via the network, and (5) deny, based on the second user lend authorization and in response to the received other second user access request, access to the stored first data unit by the second user.

5. The system of claim 4, wherein the processor is further configured to (1) store each of the received data units in the database also in association with a lending time to live (LTTL) limitation parameter, (2) receive, subsequent to receipt of the second user lend authorization, another request to access the stored first data unit from the fourth user via the network, and (3) deny, based on the LTTL limitation parameter and in response to the received other fourth user access request, access to the stored first data unit by the fourth user.

6. The system of claim 1, wherein the processor is further configured to (1) receive another inquiry, directed to a fourth user in the user community, requesting information relevant to another particular subject, from a fifth user in the user group via the network, (2) direct transmission of the received other inquiry to the fourth user via the network, (3) receive, from the fourth user via the network in response to the transmitted other inquiry, a recommendation to forward the other inquiry to a sixth user in the user community, and (4) directing transmission of the received recommendation to the fifth user and the sixth user.

7. The system of claim 6, wherein the processor is further configured to (1) receive a request to form a user group including the fifth and the sixth users, and (2) establish a user group within the user community including those users.

8. The system of claim 1, wherein the processor if further configure to (1) store the received first data unit in the database also in association with a required security clearance level (SCL) limitation parameter, (2) determine a security clearance of the second user, (3) compare the determined security clearance to the associated SCL limitation parameter to determine that the second user has the required security clearance level, and (4) to allow the second user to access the first data unit based also on the determination that the second user has the required security clearance level.

9. The system of claim 1, wherein the processor is further configured to (1) log authorizations to share stored data units, with respect to each user, and (2) at least one of (a) rate the first user in a range between promiscuous sharer and information hoarder based on the log and (b) modify the stored S limitation parameter based on the log.

10. The system of claim 1, wherein:
 the information object in the stored first data unit is encrypted with a cryptographic key generated by the first user; and
 the processor is further configured to (1) receive the cryptographic key encrypting the stored first data unit, and direct transmission of each received cryptographic key to an escrow agent.

11. The system of claim 1, wherein the processor is further configured to (1)receive, from the second user via the network, an indication of how valuable the first data unit is in addressing the inquiry, (2) determine a value amount based on the received value indication, and (3) assign the determined value amount to the first user.

12. The system of claim 1, wherein the received information object in the first data unit is copy protected.

13. The system of claim 1, wherein the first user is one of a human being and an intelligent system having the logic to perform automated script fetches from information servers on the network.

14. A system for controlling distribution of information stored on a network, comprising:
a data store including a database; and
a hardware processor configured to (1) receive (i) data units, each including a copy protected information object encrypted with a cryptographic key K, and (ii) each cryptographic key K encrypted with another cryptographic key, from contributing users in a community of users via a network, each received data unit being received from a single contributing user, (2) store, in the database, the received data units, each in association with an identifier of the contributing user and a sharing (S) limitation parameter restricting the amount of sharing of the received data unit allowed, a sharing time to live (STTL) limitation parameter setting a time period after which a sharing authorization expires, a loan time to live (LTTL) limitation parameter setting a time period after which a borrowing authorization expires, and a security clearance level (SCL) limitation parameter setting a minimum security clearance level required for access, (3) directing transmission of each received encrypted cryptographic key K to an escrow agent, (4) receive inquiries from inquiring users via the network, each inquiry being directed by the applicable inquiring user to one or more users and requesting information relevant to a respective particular subject, (5) direct transmission of the received inquiries as directed via the network, (6) receive, via the network, responses to the transmitted inquiries including contributing user authorizations of the inquiring users to share the stored data units, non-contributing user authorizations of the inquiring users to further share the stored data units, non-contributing user authorizations of the inquiring users to borrow the stored data units and recommendations for the inquiring users to direct their inquiries to other recommended users in the user community, (7) receive, via the network, revocations of previously received share authorizations, further share authorizations, and borrow authorizations, (8) receive, subsequent to receipt of the authorizations, request to access the stored data units from the inquiring users via the network, (9) allow or deny access to the stored data units in response to the received access requests, based on the received share authorizations, the received further share authorizations, the received borrow authorizations, the received revocations, the stored S limitation parameters, stored STTL limitation parameters, stored LTTL limitation parameters, and the stored SCL limitation parameters, (10) direct transmission of the received recommendations to the applicable inquiring users and the other recommended users, (11) receive requests to form user groups including the applicable inquiring users and the recommended users to whom recommendations have been transmitted, and establishing user groups within the user community in accordance therewith, (12) log (i) the received share authorizations, (ii) the received further share authorizations, (iii) the received borrow authorizations, (iv) the received recommendations, (v) the received revocations, and (vi) the received access requests, with respect to each user; and (13) at least one of (i) generate a rating for each of the users in the user community in a range between promiscuous sharer and information hoarder based on the log, (ii) modify the stored S limitation parameter based on the log, (iii) modify the stored STTL limitation parameter based on the log, (iv) modify the stored LTTL limitation parameter based on the log, and (v) modifying the stored SCL limitation parameter based on the log, (14) receive, from the inquiring users via the network, indications of how valuable the stored data units they were authorized to share or borrow, and the recommendations they received, were in addressing their inquiries; and

(15) rate the authorizing and recommending users based on the received value indications;

wherein the users in the user community include human beings and an intelligent systems having the logic to perform automated script fetches from information servers on the network.

* * * * *